US011024341B2

(12) United States Patent
Boonmee et al.

(10) Patent No.: US 11,024,341 B2
(45) Date of Patent: Jun. 1, 2021

(54) CONFORMANCE OF MEDIA CONTENT TO ORIGINAL CAMERA SOURCE USING OPTICAL CHARACTER RECOGNITION

(71) Applicant: Deluxe Entertainment Services Group Inc., Burbank, CA (US)

(72) Inventors: Marvin Boonmee, Torrance, CA (US); Weyron Henriques, Pasadena, CA (US)

(73) Assignee: COMPANY 3 / METHOD INC., Burbank, CA (US)

( * ) Notice: Subject to any disclaimer, the term of this patent is extended or adjusted under 35 U.S.C. 154(b) by 0 days.

(21) Appl. No.: 16/376,580

(22) Filed: Apr. 5, 2019

(65) Prior Publication Data

US 2019/0311747 A1   Oct. 10, 2019

Related U.S. Application Data

(60) Provisional application No. 62/654,229, filed on Apr. 6, 2018.

(51) Int. Cl.
*G11B 27/34*   (2006.01)
*G11B 27/30*   (2006.01)
(Continued)

(52) U.S. Cl.
CPC .......... *G11B 27/34* (2013.01); *G06K 9/00744* (2013.01); *G06K 9/34* (2013.01);
(Continued)

(58) Field of Classification Search
USPC ................................. 386/239–248, 278–290
See application file for complete search history.

(56) References Cited

U.S. PATENT DOCUMENTS 10,067,669 B1 *   9/2018  Mahmoud ................. G06K 9/03
2005/0033758 A1 *  2/2005  Baxter .................... G11B 27/28
(Continued)

FOREIGN PATENT DOCUMENTS

GB   2189037 A     10/1987
GB   2 312 078 A *  10/1997 .............. G06F 17/30

OTHER PUBLICATIONS

"European Partial Search Report", dated Jul. 26, 2019, in European Application No. 19167625, 14 pages.
(Continued)

*Primary Examiner* — Hung Q Dang
(74) *Attorney, Agent, or Firm* — Dorsey & Whitney LLP

(57) ABSTRACT

A clip of shots is uploaded to a conformance platform. The conformance platform evaluates the clip type and initiates shot boundary evaluation and detection. The identified shot boundaries are then seeded for OCR evaluation and the burned in metadata is extracted into categories using a custom OCR module based on the location of the burn-ins within the frame. The extracted metadata is then error corrected based on OCR evaluation of the neighboring frame and arbitrary frames at pre-computed timecode offsets from the frame boundary. The error corrected metadata and categories are then packaged into a metadata package and returned back to a conform editor. The application then presents the metadata package as an edit decision list with associated pictures and confidence level to the user. The user can further validate and override the edit decision list if necessary and then use it to directly to conform to the online content.

22 Claims, 7 Drawing Sheets

(51) Int. Cl.
*H04N 21/44* (2011.01)
*G11B 27/031* (2006.01)
*G06K 9/34* (2006.01)
*G06K 9/00* (2006.01)

(52) U.S. Cl.
CPC ........ *G11B 27/031* (2013.01); *G11B 27/3036* (2013.01); *G11B 27/3045* (2013.01); *G11B 27/3081* (2013.01); *H04N 21/44008* (2013.01); *G06K 2209/01* (2013.01)

(56) References Cited

U.S. PATENT DOCUMENTS

| | | | | |
|---|---|---|---|---|
| 2007/0058856 | A1* | 3/2007 | Boregowda | G06K 9/3258 382/159 |
| 2007/0297757 | A1 | 12/2007 | Kauffman et al. | |
| 2013/0259390 | A1* | 10/2013 | Dunlop | G06K 9/00751 382/224 |
| 2013/0276046 | A1* | 10/2013 | Park | H04N 21/4622 725/110 |
| 2015/0109406 | A1* | 4/2015 | Carlsson | H04N 7/147 348/14.13 |
| 2020/0005831 | A1* | 1/2020 | Wallner | H04N 5/2628 |

OTHER PUBLICATIONS

Moghnieh Hussein, "Scanned Numbers Recognition Using k-Nearest Neighbor (k-NN)", Feb. 4, 2018, retrieved from Internet: https://towardsdatascience.com/scanned-digits-recognition-using-k-nearest-neighbor-k-nn-d1a1528f0dea, retrieved on Jul. 15, 2019.

"Extended European Search Report", dated Jun. 8, 2020, in European Application No. 19167625.3, 15 pages.

Liu, Fang et al., "Improving the Video Shot Boundary Detection Using the HSV Color Space and Image Subsampling", 7th International Conference on Advanced Computational Intelligence, Mount Wuyi, Fujian, China, Mar. 27-29, 2015, 4 pages.

Sun, Bin et al., "A Method for Video Shot Boundary Detection Based on HSV Color Histogram and DPHA Feature", College of Telecommunications and Information Engineering, Nanjing University of Posts and Telecommunications, Nanjing, China, Mar. 22, 2017, 4 pages.

* cited by examiner

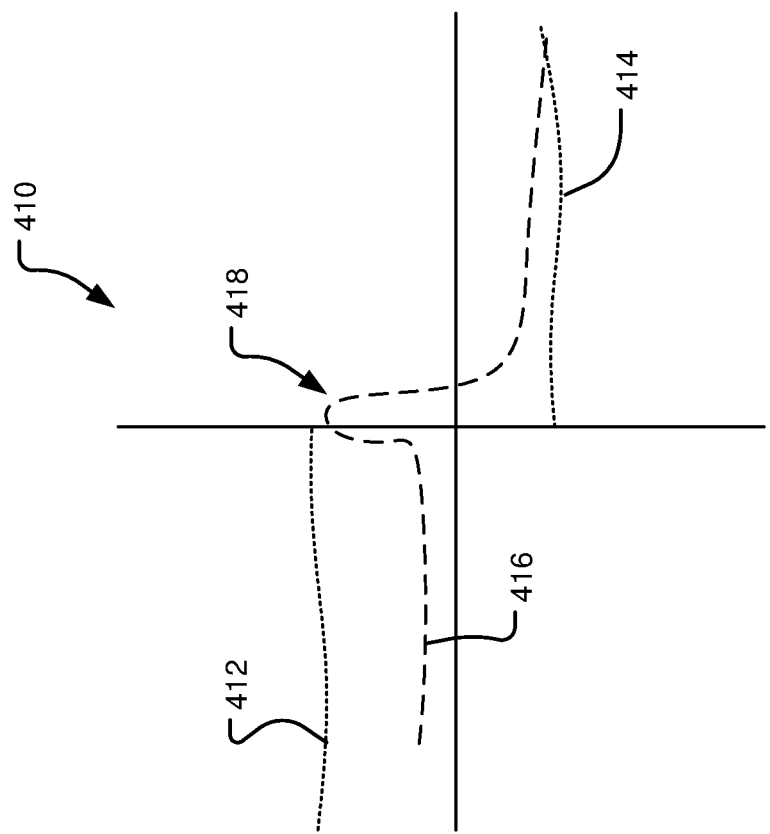
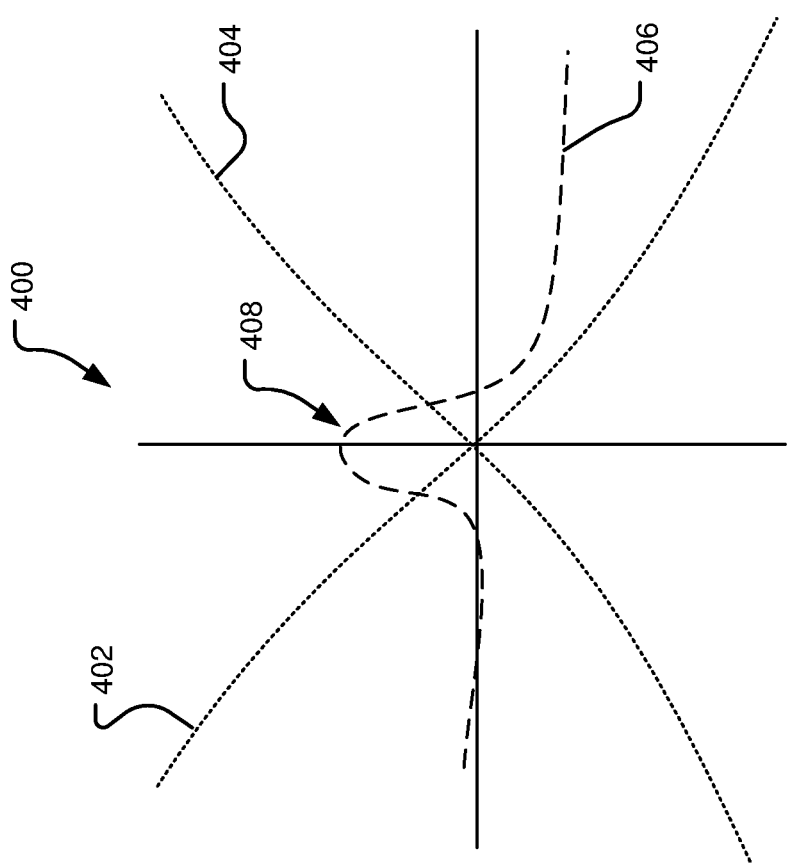
Fig. 4A
Fig. 4B

CONFORMANCE OF MEDIA CONTENT TO ORIGINAL CAMERA SOURCE USING OPTICAL CHARACTER RECOGNITION

CROSS REFERENCE TO RELATED APPLICATIONS

This application claims the benefit of priority pursuant to 35 U.S.C. § 119(e) of U.S. provisional application No. 62/654,229 filed 6 Apr. 2018 entitled "Conformance of media content to original camera source using optical character recognition," which is hereby incorporated herein by reference in its entirety.

TECHNICAL FIELD

The technology described herein relates to identification of original film or video frames in raw footage from post-production working copies using optical character recognition.

BACKGROUND

Creating and editing advertising campaigns for movies or television are typically outsourced to creative marketing companies or studios by the primary production company. These creative studios produce promotional campaigns in the form of short video clips or commercials ("spots") to provoke impact and awareness of the film or television show or to market a related or tie-in product. The content used to create these sequences or spots is derived from the raw footage (often referred to as "dailies") generated from hundreds, if not thousands, of hours of principal photography. The promotional spot can be created from a wide range of digital content production including, for example, movies, television shows, commercials, documentaries, or news gathering footage. However, the original source content (from principal photography) is not provided for use during the creative process of developing the promotional spots. Rather, the promotional campaigns work with lower resolution copies of the source content, referred to as "offline content," when designing these spots.

"Offline editing" is part of the post-production process of filmmaking and television production in which raw footage is copied and then the copy, the offline content, is edited at a lower quality to save time and money before committing decisions to the original source content. Once the project has been completely edited offline, the original media is assembled in an "online editing" stage from the high quality source elements. The offline content, derived from dailies footage, used for marketing spots usually contains timecode and scene and take information. This information is visibly "burned-in" to the frames of the offline content to provide reference for synchronous sound and picture. Once the promotional spot is edited, the burned-in information in the frames of the edited spot is compared to the source metadata (i.e., time code, audio code, scene, and take information) from dailies and is used to search, compile, edit, and eventually assemble appropriate lengths of the original high-quality picture and audio to compose the final product. This process using the source content to assemble a final, high-quality promotional spot is also known as "online editing." The high-quality nature of these campaign spots are critical to drive consumer motivation.

The creative studios that develop and create promotions use a number of different creative vendors to edit numerous versions of clips within the marketing campaigns. The various versions may reveal suspense, emotions, comedy, digital effects, or action and adventure. Other clips may be product tie-ins that depict a product as used in the film or show. While the editorial metadata (i.e., time code, audio code, scene and take information, etc.) is critical to the content making process, marketing does not rely on this information, but rather focuses solely on the content of the promotion without concern for the technical relationship to the source content. Marketing clip creation is detached from the metadata that is ultimately necessary for compiling the elements that make-up the high-resolution "online" or final version of a clip ready for presentation. Moreover, the creative vendors transfer the editorial offline content among different partners for building specific effects and cuts. The different partners are never aligned in the type and version of their editorial systems. Every exchange of marketing editorial cut versions among the partners inevitably results in stripping of the valuable source metadata from the video content. As a result, it is virtually impossible to automatically map the final cut version of the offline edited shot to the online or source frames from the original camera capture.

Conversely, the feature film editing teams share the same practice for storytelling, i.e., they work with lower resolution "offline" copies, but with one major difference. They maintain the master database, sometimes referred to as the codebook, which contains all metadata referencing the original source content. Due to the incongruent nature of entertainment and marketing lines of business, the master databases cannot be shared in an efficient manner with the numerous campaign editors hired to create promotional spots.

The only commonality between the marketing clips and the feature product will be the visible timecode and other alphanumeric characters that are burned into the work picture generated from the dailies clips during principal photography. The work-in-progress video is sometimes referred to as a "work print" and will be significantly lower quality than the final product. In order to create a high quality promotional clip, the work print must be "conformed," i.e., the original source frames corresponding to the frames in the work print must be identified and copies of those high quality frames must be edited and sequenced to recreate the promotional clip in the work print.

The complexity of rebuilding the promotional clip into a finished form increases exponentially when it is time to reassemble and re-master the final clip from the high-resolution source elements. This necessitates a time-consuming manual labor approach known as listing or breakdowns—a process of identifying and compiling a list of shots selected for the clip. Finishing supervisors manually input the visible time code on the work print into a spreadsheet to begin the process of matching offline shots with the corresponding master source shots. A significant amount of time is devoted to transcribing and troubleshooting time code and other identifiers into a spreadsheet which is then translated into an edit decision list (EDL). The EDL enables the location and identification of the high-resolution source content for the online finishing process, but not without errors due the manual nature of the procedure.

The information included in this Background section of the specification, including any references cited herein and any description or discussion thereof, is included for technical reference purposes only and is not to be regarded subject matter by which the scope of the invention as defined in the claims is to be bound.

SUMMARY

A method is disclosed herein to conform offline video content (e.g., for marketing and promotional campaigns), devoid of metadata, to the original camera source, by perceptually detecting shot boundaries, transitions, and visible character burn-ins from video and compiling it into a metadata rich edit decision list (EDL) that maps the offline video to the camera source frames. The burn-ins with time codes and other frame and camera information are parsed using an optical character recognition process that is designed to parse the detected characters from the video frames.

This conform method eliminates the dependency on manual listing and breakdown and significantly decreases the need for troubleshooting the process of linking to the original source. The net result is faster turnover times for conformance of offline video content with nearly perfect accuracy.

In some implementations, a method for conforming offline video content to original source frames is performed in a computer system having a processor and a memory. In other implementations, a non-transitory computer program product is provided with instructions for configuring the processor of the computer system to conform offline video content to original source frames. The method performed by operation of the processor in the computer system may include the following steps. Likewise, the instructions on the non-transitory computer readable medium configuring the processor configure the processor to perform the following steps.

A video clip is ingested within the memory of the computer system. The video clip includes a series of frames and having a plurality of shots and shot boundaries therein and further includes frame identification information burned into a perimeter of a plurality of the series of frames. The processor identifies the shot boundaries between adjacent frames within the video clip and locates burn-in areas in the frames adjacent to the shot boundaries that contain burn-in information. The processor further perceives character strings within the burn-in areas in the frames adjacent to the shot boundaries; recognizes visually perceptible characters within the character strings; and separates the visually perceptible characters. The processor then performs an optical character recognition using a trained classifier on the separated visually perceptible characters to identify the frame identification information represented by the characters. The frame identification information is stored by the processor as a metadata file in a relational database within the memory for use with an edit decision list application to identify source image frames corresponding to the frame identification information to create a high-resolution instantiation of the video clip.

Errors in the identified frame identification information may be corrected by via operations within the processor by determining cadence, consistency, or both, between timecodes in the frame identification information in adjacent frames and adjusting timecodes of inconsistent frames or out of cadence frames to conform with the consistency or cadence of other frames within a particular shot in the video clip. Similarly, errors in the identified frame identification information may be corrected by determining consistency of a file name in the frame identification information in adjacent frames and adjusting the file names of inconsistent frames to conform with consistency of other file names of other frames within a particular shot in the video clip.

The step of identifying the shot boundaries may further include masking an area of the frames of the video clip without covering bands along a top edge and a bottom edge of each of the frames; computing a perceptual fingerprint of each frame outside of the area covered by the mask; and comparing the perceptual fingerprint values between frames to determine difference values between frames. If the difference value between frames is below a threshold value, categorizing the compared frames may be categorized as being within a same shot. Alternatively, if the difference value between frames is above the threshold value, the compared frames may be categorized as being within different shots.

The step of identifying the shot boundaries may further include locating a darkest frame in the video clip and identifying a presence or absence of a watermark in the darkest frame. If a watermark is identified, a boundary area of the watermark may be defined and the masked area may be fitted to the boundary area of the watermark.

In some implementations, the computation of the perceptual hash may be based upon color values of pixels in the frames. In this instance, the step of identifying the shot boundaries may include identifying whether the shot boundary is a cut or dissolve based upon the perceptual hash of the color values. In other implementations, the computation of the perceptual hash may be based upon luminance values of pixels in the frames. In this instance, the step of identifying the shot boundaries may include identifying whether the shot boundary is a fade based upon the perceptual hash of the luminance values.

In some implementations, the step of locating burn-in areas may further include masking an area of each frame without covering bands along a top edge and a bottom edge of each frame. In some implementations, the step of perceiving character strings may further include converting color information in each frame to hue/saturation/value information. The hue and saturation information may be discarded and morphological operations may be performed on the bands to increase a contrast between characters in the bands and a background of the bands.

In some implementations, the step of recognizing visually perceptible characters may further include pyramid downsampling the bands to identify connected characters and identifying contours of connected characters.

In some implementations, the step of separating visually perceptible characters may further include segmenting connected characters, identifying contours of individual characters previously segmented, and resizing the segmented characters into a uniform character image size.

Additionally, the step of performing optical character recognition may include using a trained nearest neighbor classifier.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIGS. 4A and 4B are schematic graphs of shot boundaries for dissolve transitions and fade transitions, respectively.

DETAILED DESCRIPTION

Figure 1:
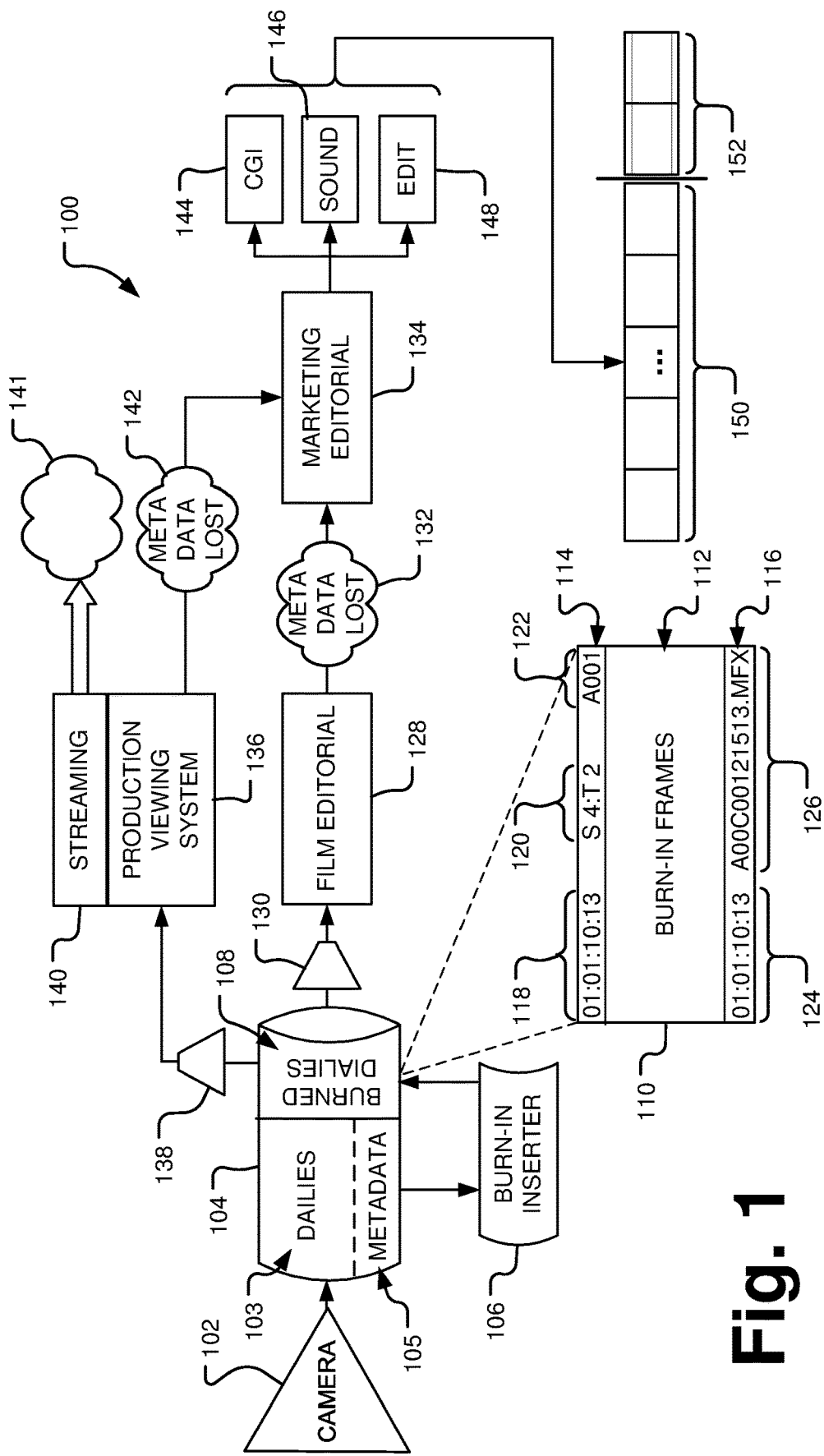
FIG. 1 is a schematic diagram of a typical marketing editorial production system and process for creating promotional video clips related to a principal film.

A process is disclosed herein for conforming offline video content to original camera source frames by using optical character recognition (OCR). This conform process is a significant improvement over the manual process used at present to identify frames in marketing clips and search through the source camera frames to find the matching frame sequences. The following is a short list of terms used herein and their meaning within the context of this disclosure.

A "burn-in" is a film or video frame in which metadata information about the frame is overlaid on the frame, typically within narrow bands along the top and bottom edges of the frame. These bands typically do not intrude upon the camera image captured in the frame, particularly when filming in a wide aspect ratio. With digital cinematography, the burn-in is usually implemented by a software process that masks the top and bottom of each image frame with the bands of metadata information. (When performed on film, a burn-in is a photo-developing process that "burns" or visually inscribes the alphanumeric information into the film via light exposure.) The metadata typically includes information such as the frame time code, the audio track time code, the scene and take number, the camera roll name, and the file name in alphanumeric characters that are perceptible to a human.

A "clip" is a short (typically 30 seconds to 3 minutes) film sequence composed of a number of shots. In the context of the present disclosure, reference to a clip usually (but not always) indicates a marketing, promotional, or advertising film or video incorporating shots or portions of shots from the larger library of shots filmed over the course of the entire project. Further, reference to a clip herein will also usually (but not always) indicate a file of frames edited from low resolution video copy of the original, high resolution frames from the source camera.

A "shot" is a sequence of film or digital video frames that typically make up a continuous and contiguous take within a longer scene. Shots of the same scene may be taken from different camera angles and may be repeated multiple times in order to capture a best or desired performance. A single shot may correspond to an entire scene or multiple shots may be pieced together to form a single scene. Boundaries between shots may be presented in a final clip by various transition effects including cuts, dissolves, and fades or wipes.

A "cut" refers to an abrupt transition from one shot to another shot in a clip or other video sequence.

A "dissolve" refers to a gradual transition from one shot to a neutral, blank frame, usually black or from a neutral, blank frame into the frames of the shot.

A "fade" or "wipe" refers to a gradual transition between shots by merging or overlaying the frames from each adjacent shot on the boundary between them. The intensity of the first shot lessens over a sequence of frames until the first shot ends while the intensity of the second shot starts low and gradually increases to full intensity when the frames from first shot end.

To instantiate the conform process, a marketing spot, i.e., a video clip of shots, created and edited offline is uploaded into a computer system with appropriate memory and storage for processing the video clip to recognize identifiable information in the frames that can associate the frames in the clip with the original camera source frames. Such identifiable information includes "burn-ins" along the top and bottom edges of the video frames in the clip. Depending upon how the video frames in the clip were manipulated during the offline editing process, some or all of the frames used in the marketing clip may still have burn-in information visible along the top and bottom edge of the frames. For example, if the frame size of a shot used within a clip is not changed, the burn-in information should still be present. Alternatively, if the frames in a shot are enlarged for example, the burn-in information may be lost as it is pushed beyond the edge of the frame size during the enlargement process.

The conform process first evaluates the clip for shot boundaries. Shot boundaries are highly indicative that the frames comprising the particular shot were all part of the same scene and take, were shot by the same camera, are in the same data file, and have time codes in sequence. This is not always the case, but it is a highly probable presumption from which to start. Upon detection of shot boundaries, the conform process uses the boundaries to seed the frames for OCR evaluation of the burn-in information. The OCR-extracted information is then error corrected based on OCR-extracted information from the neighboring frames and from arbitrarily selected frames in the same shot. Based upon the error correction, the conform process establishes a confidence level per item of information extracted per shot. The conform process further packages the extracted information as metadata in a data bundle. The data bundle may be accessed by and presented in an edit decision list (EDL) module or in tabular form for final review and approval by a user in an editing program that assembles a high resolution clip from the primary camera source frames, i.e., in an "online" editing process.

FIG. 1 schematically depicts an exemplary editing system 100 that also shows a process flow from the original source camera 102 through to the offline creation of a promotional clip 150. In most examples described herein, the system 100 and related processes are discussed in terms of digital image capture and processing. However, it should be understood that the conform process can also be applied to traditional film and video to extract information from the burn-ins in such physical media as well.

Returning to FIG. 1, primary film photography from the cameras 102 on a film project is transferred to a video server 104 or other appropriate video storage device. This raw footage is referred to in the film industry as "dailies" 103. The raw footage is extremely high quality and high resolution and each frame is a very large file size. For example, camera outputs in formats such as ArriRaw, R3D, and Sony Raw can be up to 35 MB per frame. With digital photography, metadata 105 including several types of information about each frame of the dailies 103 is also provided by the camera 102 and saved in the video server 104. This metadata 105 may include the time code for each frame, potentially an audio time code for sound associated with the frame, a camera identifier, the scene and take numbers, and the file name of the digital image file of the shot in which the frame appears. The metadata 105 is linked to the respective frames of the dailies 103 in a data structure in the video server 104.

It may be appreciated that in an animated movie, shots from scenes can be output directly from computer generated imagery (CGI) software as raw digital film frames and stored as dailies 103 in a similar manner to image frames recorded by a camera. Metadata 105 corresponding to each animated frame is also output from the CGI software and stored in a data structure to index, manage, and identify particular frames during the editing process. Thus, the conform process described herein is equally applicable to animation clips and features.

A burn-in insertion module 106 may be linked to the video server 104. The burn-in insertion module 106 processes the frames from the dailies 103 and converts the high-resolution raw footage of the dailies 103 into lower resolution files for easier use in initial editing processes. For example, the raw footage may be downconverted to Quicktime or another similar format. In addition to reducing the data size of each frame, the burn-in insertion module 106 further accesses the associated metadata 105 and inserts visually perceptible renderings of the metadata 105 into each frame. Once the burn-ins of the metadata information are complete, the downconverted, burned-in images may be stored in the video server 104 (or a separate video server) as low resolution ("low-res") dailies 108 for later use in the editing process. The metadata 105 may remain associated with the burned-in frames 110 in the data structure of the video server 104 as well.

An exemplary representation of a burned-in frame 110 is depicted in FIG. 1. The visually perceptible information may be inserted into bands 114, 116 along the top and bottom edges of each burned-in frame 110. The burn-in insertion module 106 may change the aspect ratio output of the downconverted, burned-in frames 110 to provide additional room for the bands 114, 116 while leaving the original aspect ratio of the image 112 in each burned-in frame 110 intact. The bands 114, 116 may cover up to the top 20 percent and bottom 20 percent of the lower resolution burned-in frame 110. In some embodiments, the bands 114, 116 may have a width of only 7-10 percent of the top and bottom portions of each burned-in frame 110. The metadata 105 associated with each original camera or CGI frame may be presented in a visually perceptible manner as alphanumeric characters within the bands 114, 116. In one embodiment, the background of the bands 114, 116 may be black or another dark color while the characters may be presented in white or a contrasting light color. However, any contrasting color scheme may be used, for example, a white or light background with black or dark colored characters. Such visually perceptible information may include, for example, a video time code 118 for each frame, the scene and take numbers 120 of the shot to which the frame belongs, a camera identifier 122, an audio time code 124 for sound associated with the frame, and the file name 126 of the digital image file that includes the frame.

The low-res dailies 108 are available to several downstream users for additional production activities. Paramount among such users are the film editors who select shots from and assemble the raw footage from the dailies 103 into the final film product. A film editorial module 128 may be connected to the video server 104 to access the low-res dailies 108 for editing. The burned-in frames 110 from the low-res dailies 108 may be transferred to the film editorial module 128 along with the corresponding metadata 105 to aid in the editing process and maintain reference to frames in the original raw footage. The low-res dailies 108 may be transferred at their original size, or another downconverter 130 may further reduce the frame size for quicker transfer if there are bandwidth limitations or for faster processing capability by the film editorial module 128. For example, in one embodiment, the burned-in frames 110 of the low-res dailies 108 may be downconverted to file formats with sizes between 36 Mbits and 115 Mbits per frame.

Another group of users that regularly accesses and reviews the burned-in dailies 108 are the directors, executives, producers, and investors in the film production. The low-res dailies 108 may be transferred to a production viewing system 136 at their original size, or another downconverter 138 may further reduce the frame size for faster transfer if there are bandwidth limitations or for faster processing capability by the production viewing system 136. For example, in one embodiment, the burned-in frames 110 may be downconverted to file formats with sizes between 36 Mbits and 115 Mbits per frame. The low-res dailies 108 may then be viewed directly through the production viewing system 136 or they may be streamed to users via a streaming module 140 associated with the production viewing system 136 to provide review capabilities to users remote from the production. The streaming module 140 may transmit the low-res dailies 108 over publicly accessible networks 141 (e.g., the Internet) in order to reduce the possibility of unauthorized copying of portions of a film, especially before it is released for public performance.

A third user group of "marketing editors" may be provided copies of some of the low-res dailies 108 to develop marketing campaigns associated with the primary film production. These users with marketing editorial systems 134 create advertising and promotional clips, commercials, and product advertising tie-ins to the feature film. Often multiple third party agencies or studios outside of the production are hired by the production team to provide the marketing and promotional services. For purposes of security, and because development of proposed promotional clips does not require access to raw footage, each marketing editorial system 134 works with the low-res dailies 108 with shots provided from the film editorial system 126 or from the production viewing system 136 pertinent to the focus of each promotional project. Further, no metadata 105 is transferred with the low-res dailies 108 from either the film editorial system 126 or the production viewing system 136. The metadata 108 is withheld from transmission as is indicated in transmission paths 132 and 142. Therefore, the marketing editorial system 134 only receives frame identification information in the form of the characters in the burn-in frames 110 constituting the low-res dailies 108.

Further, the development and offline editing of marketing and promotional clips 150 is often distributed among a number of third party creative service vendors. For example, a visual effects (VFX) or CGI service 144 may provide visual effects or computer generated enhancements to images or shots in the promotional clip 150. The effects process may generate its own related time codes that may be superimposed on frames and obscure the burn-in data on the original low-res dailies 108. A sound effects service 146 may provide additional sound effects to certain shots in the promotional clip. An editing service 148 may alter the presentation of the frames. For example, it may be desirable to zoom certain frames to focus on or highlight images in the frames. Another desired effect may be to pan across the image in a frame or frames, thereby creating multiple additional copies of a frame or frames in a final edit of the promotional clip 150. These and other editing techniques can potentially remove the burn-in information from these frames. However, the original, full burn-in frames 110 for edited frames in the final edit of the promotional clip are typically appended to the file package for the promotional clip 150 to aid in rendering a high fidelity copy of the promotional clip 150 from the raw footage of the dailies. Regardless, as the final file package of the promotional clip 150 includes edited files from multiple services 144, 146, 148 with effects, zooms, pans, and other edits, the burn-ins may be difficult to perceive or find in the offline edit of the promotional clip 150. Manual review of the frames of the promotional clip 150 and manual creation of an edit list from such review is often the best conformance method to identify the source frames in the raw footage necessary to assemble a high fidelity marketing spot.

Figure 2:
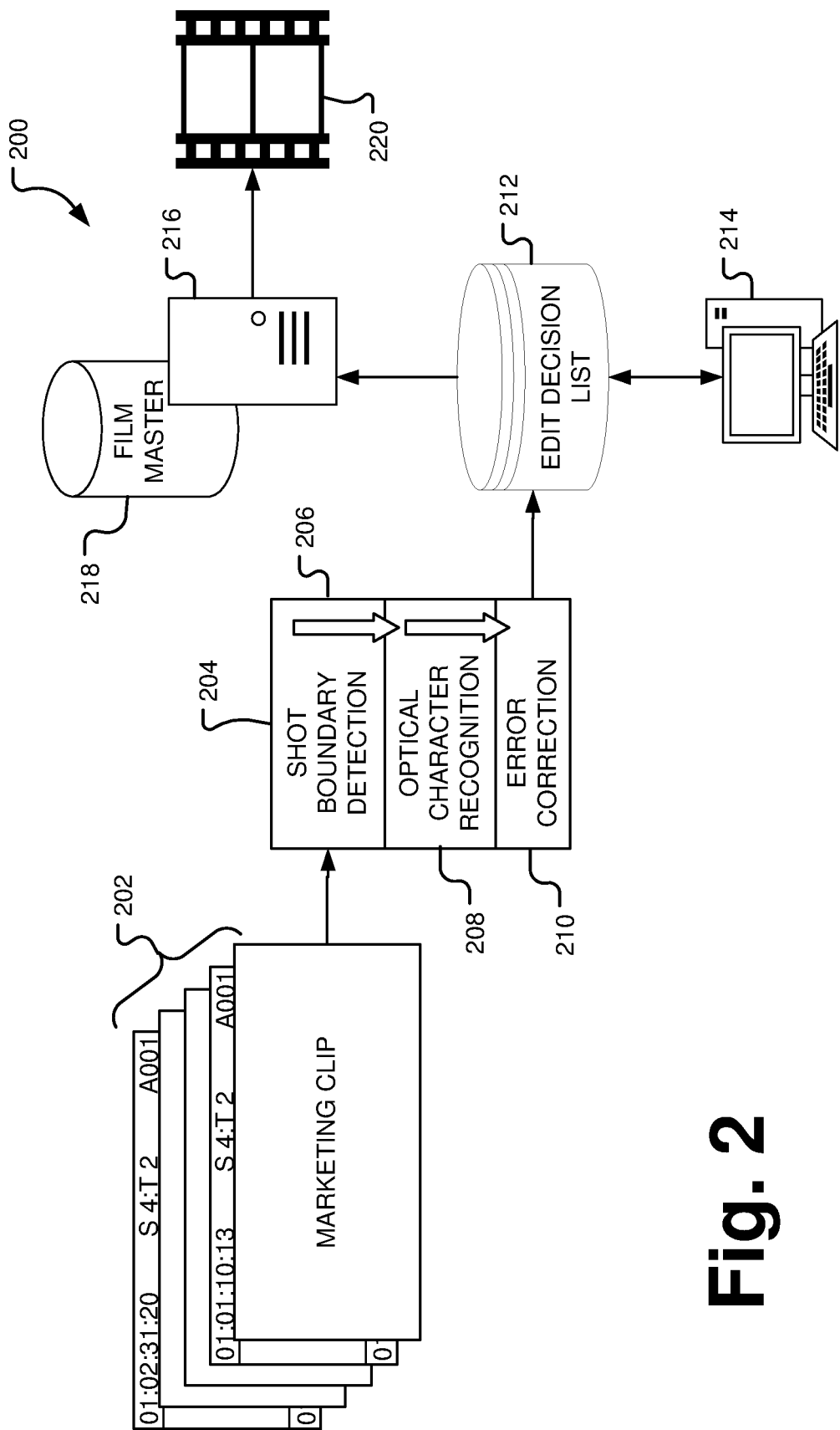
FIG. 2 is a schematic diagram of a system for identification of burn-in information in clips created in an offline marketing editorial process.

As depicted in FIG. 2, the input to the conform system 200 disclosed in the present application is a video clip 202 (e.g., the promotional clip 150 of FIG. 1) representing an assemblage of shots. The video clip 202 can be a single movie file or a sequence of files. The video clip 202 is assumed to have, in most or all the frames, burned-in original source frame metadata such as alphanumeric characters including timecode representation. These alphanumeric characters are assumed to be grouped together as "words" which correspond to different classes of metadata. Exemplary word types corresponding to metadata may be, but are not limited to, camera roll name, video file name, source time code, audio time code, and scene and take numbers located at arbitrary positions within each frame of the clip. The positions of the burned-in character words are usually assumed to be in the top 20% and the bottom 20% of each frame, but are not necessarily required to be restricted to those areas.

For example, the following could be a set of burn-ins in the video frame of a shot:
Top left=01:01:10:13 (source time code)
Top Center=Scene 4 Take 2 (scene and take numbers
Top Right=A001 (camera roll name)
Bottom left=01:01:10:12 (audio timecode)
Bottom Right=A001C00121513.MXF (file name with extension)
(See, for example, burned-in frame 110 in FIG. 1.) The burned in character words may vary in position and size from frame to frame within a shot. For example, if a pan or zoom edit is performed, the character words may be enlarged or reduced in size and shifted horizontally or vertically or possibly shifted partially or entirely beyond the edge of the frame. While it is preferred to have white text on black background, the burned-in words can be any color of text on an arbitrary contrasting background color. The background may alternatively be fully transparent, semi-transparent, or completely opaque.

The video clip 202 is ingested into a conform processor 204 to detect and perceive the original metadata information rendered in the frame burn-ins, and to further enhance the confidence in the detected data. The conform processor 204 may accomplish these tasks within a series of modules. First, a shot boundary detection module 206 may be used to find the transition between adjacent shots within the video clip 202. By determining likely shot boundaries, it is more likely than not that the frames on each side of the boundary were filmed as part of the same respective shots and the frames within each are in time code sequence with each other. Once the shot boundaries are determined, the frames in each shot may be processed by an optical character recognition (OCR) module 208. The OCR module 208 performs a number of steps further described in detail below to determine locations of "words" in each frame in a clip and to parse the characters of the words individually to identify the original metadata associated with each frame. This individual character parsing is necessary because, unlike typical OCR processing which attempts to identify likely known words against a dictionary based upon likely character series, the words in the frames are merely numerical sequences or file names, which are gibberish in the context of a dictionary look-up. Therefore, atypical OCR character recognition steps may be undertaken to help ensure accurate character determinations from the burn-ins. An error correction module 210 then reviews the reconstructed metadata words rendered from the burn-ins to identify inconsistencies and try to correct the same through near frame value interpolation and other relational techniques further described below.

Once the metadata association with a frame is restored, it is saved as part of the edit decision list (EDL) 212 created for the promotional clip 202. An EDL 212 is used to keep track of edits. The edits can be manually reviewed and updated by a user at an editing workstation 214. In addition, any of the frame data reconstructed by the conform processor that has a low confidence value after error correction can be flagged for review by the editing workstation 214. A user can visually inspect the burn-ins on any frames in question and correct the frame information as necessary. Each time the edited video clip 202 is rendered, played back, or accessed by a video server 216, it is reconstructed from the original source repository 218 and the specified editing steps from the EDL 212 to output a high fidelity video clip 220. Use of an EDL 212 avoids modification of the original content preventing further generation loss as the video images are edited. Further, changes to the edits in the EDL 212 can be almost instantaneous.

Figure 3:
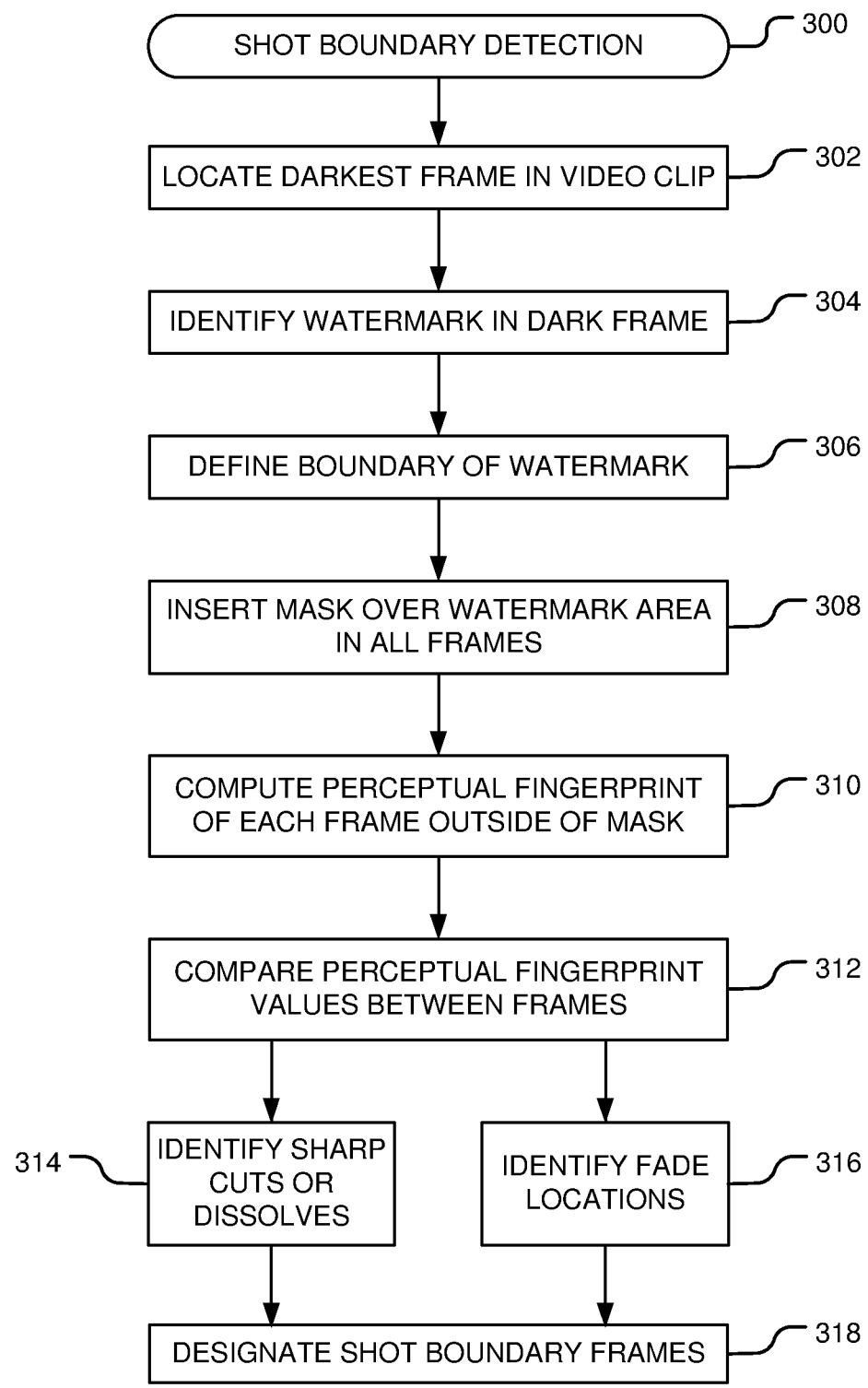
FIG. 3 is a flow diagram of a shot boundary detection process used in the detection of areas of burn-in information in video frames.

An exemplary methodology 300 for detecting shot boundaries as the first part of the conformance process is depicted in FIG. 3. As noted, shot boundaries mark the transition between two shots. The transitions may include the following types. A cut refers to a sharp change between two consecutive shots representing a different scene or a different angle of the same scene. Fade boundaries may take several forms. A fade in from a solid color involves a gradual fading from a solid color (usually black), to a picture scene. The rate of the fade in can vary either linearly or nonlinearly. A fade out to a solid color involves a gradual fade from a picture scene to a solid color, usually black and sometimes white, but not restricted to black or white. The rate of the fade out can vary either linearly or nonlinearly. A dissolve boundary from one shot to another involves a fading out of a shot while simultaneously fading in the following shot. The rate of fade in and fade out is usually a creative decision and can be either linear or nonlinear.

The first step in the shot boundary detection process 300 is to locate the darkest frame in the video clip as indicated in step 302. This will typically be a black frame from a fade in or fade out at a shot boundary. An exemplary video processing tool for identifying a dark frame is in the Python Pillow imaging library (www.python-pillow.org). For example, the PixelAccess class may be used to identify the RGB values of pixels in each frame and then calculate an average RGB value for each frame to identify the darkest frame. If the darkest frame is not completely black, the non-black pixel locations will be identified as visible watermarks as indicated in step 304. While it may be simple to assume that these dark frames are the shot boundaries, the purpose of these steps is to identify the watermarks in frames of the clip in order to help determine other types of shot boundaries. Next, the boundaries of the visible watermarks are defined as indicated in step 306. The non-black pixel locations previously determined can provide the outer limits of the watermark area across the predominately black frames. Watermarks are typically added to copies of the low-res dailies before they are exported from the video server 104 in order to control the copies and combat piracy. The boundaries of the watermark area will be used as a mask for perceptual fingerprint computations. A mask is then inserted over the watermark area in all the frames in the clip, for example, by using the PIL.ImageDraw.lmageDraw.bitmap(xy, bitmap, fill=None) algorithm in the Python-Pillow library as indicated in step 308. By masking the watermark area, the pixel values in that area are removed from any comparison between frames and any potential for skewing the comparison results is removed.

Next, the average perceptual fingerprint (hash) value for the image area in each frame outside the masked area is computed as indicated in step 310. Average image hashing algorithms work by reducing an image size (e.g., to 8×8 pixels) and converting the image to grayscale. The average (mean value) of the pixels in the reduced image (e.g., 64 pixels for an 8×8 pixel image) is calculated. If a pixel is less than the average, its hash value is set to zero; otherwise it is set to one. This results in an output hash of 64 binary digits (bits). Exemplary algorithms for calculating an average image hash value may be the Python ImageHash Library (https://pypi.python,org/pypi/ImageHash) and the Johannes-Buchner imagehash (https://github.com/JohannesBuchner/imagehash). As noted, the mask over the watermark area helps ensure greater consistency in values between related frames as the watermark pixels can cause significant aberrations in the hash values between otherwise similar, sequential frames, particularly if one frame is watermarked and another is not. As indicated in step 312, the difference in perceptual fingerprint values between consecutive frames is then computed. The perceptual fingerprint values between consecutive frames are then compared by considering the difference values as indicated in step 312. In one exemplary embodiment, adjacent frames are assumed to be within the same shot if the difference value between them is below a threshold of 8 (out of 63 max from the 64 bit hash values calculated above). A difference of greater than 8 indicates a shot boundary. This determination indicates shot boundaries both for sharp cuts and dissolves as indicated in step 314 and for fade locations as indicated in step 316. The result of this process is that shot boundary frames within the clip are designated as indicated in step 318. This allows the error correction process described below to consider each frame in a shot as related to the others, which aids in the error correction.

This rationale of accounting for shot boundaries other than sharp cuts based upon a large difference in hash values is illustrated conceptually in FIGS. 4A and 4B. It should be apparent that hash values between frames transitioning from an image to a black frame (or vice versa) will be significantly different in value and the shot boundary will be indicated. In FIG. 4A, the difference values between a series of frames in a dissolve shot boundary is graphically illustrated. Line 402 indicates a series of frames in a shot dissolving out and line 404 indicates a series of frames in a shot dissolving in. The images in the shot of line 402 and the images in the shot of line 404 are superimposed over each other for the duration of the dissolve, with the image intensity in line 402 decreasing from a high value and the image intensity of line 404 increasing from a low value. Line 406 indicates the difference in perceptual fingerprint values between adjacent frames in the clip over the period of the dissolve shot boundary. Note that while the intensity of the first shot of line 402 is dominant, the difference value remains relatively constant. However, as the intensity of the second shot of line 404 increases, the hash value of the overlapping images diverges from that of the first shot and a pronounced difference 408 materializes in line 406. Then as the images of the second shot of line 404 become more dominant, the difference values subside as the hash values between frames are more consistent.

In FIG. 4B, the difference values between a series of frames in a fade out/fade in shot boundary is graphically illustrated. Line 412 indicates a series of frames in a shot fading out and line 414 indicates a series of shots fading in. As the first shot fades out in line 412, hash values between adjacent frames will remain close. Similarly, as the second shot fades in from black in line 414, the hash values between frames is similar, so the difference between frames will remain low. However, the luminance value of frames approaching the shot boundary decreases and then starts increasing after the boundary. Thus, the methodology for fade boundaries indicated in step 316 of FIG. 3 may be adjusted to perform an alternative fingerprint on luminance values and identify the rate of change in luminance across the clip. If there is a significant change across a series of frames going from bright to dark to bright, this will result in a spike in luminance differences, which would otherwise be constant and thus indicate a fade frame boundary. Line 416 depicts the difference in perceptual fingerprint values for luminance between adjacent frames in the clip over the period of the fade shot boundary and area 418 indicates the spike.

Figure 5:
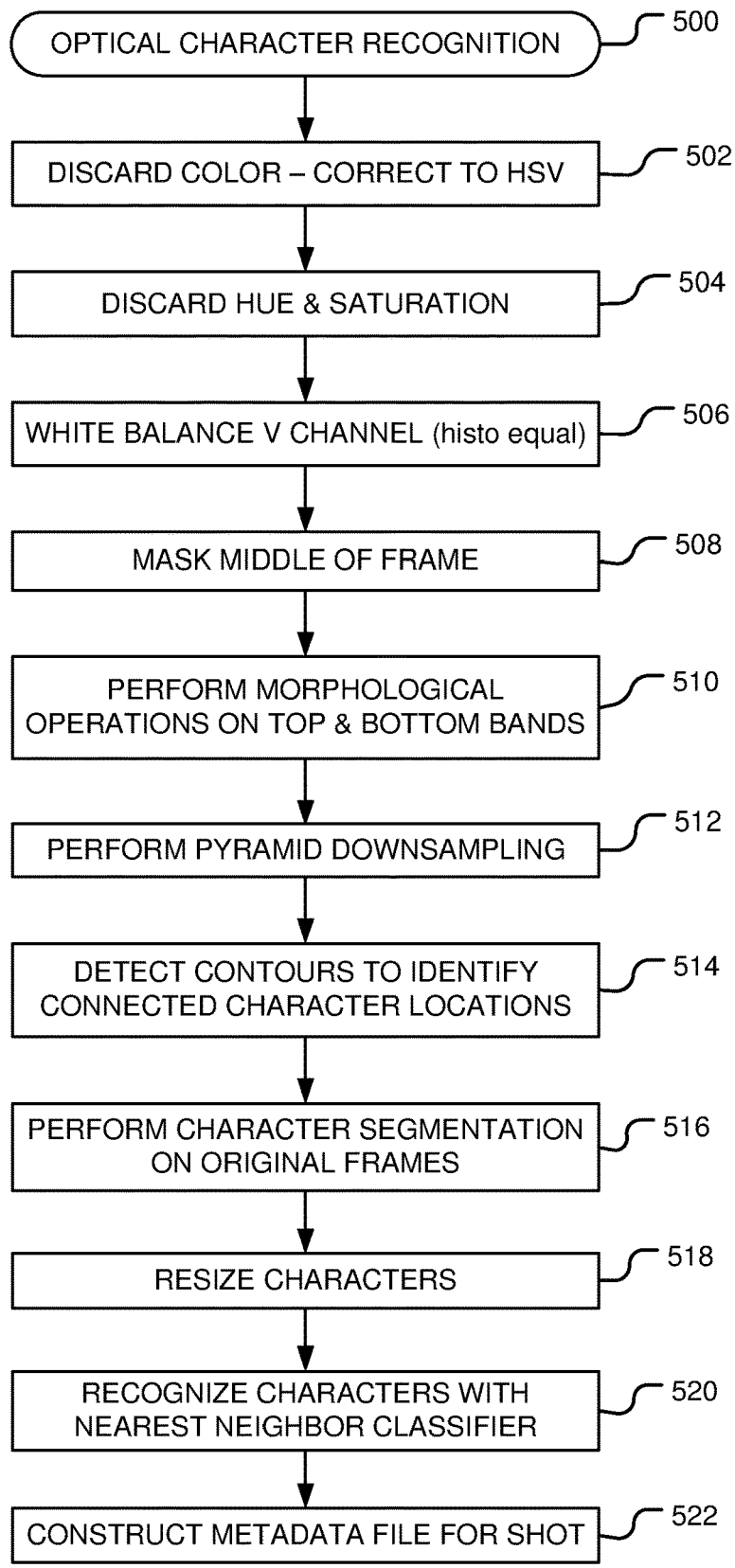
FIG. 5 is a flow diagram of an optical character recognition process designed to identify individual characters of video burn-ins.

An exemplary methodology 500 for the optical character recognition (OCR) component of the conformance process is depicted in FIG. 5. OCR is the process of digitally and logically recognizing text characters on printed or written documents using computer analysis. Typically, printed or written documents have to be scanned into digital files before analyzing them with OCR on a machine. OCR has evolved into computer packages built to recognize and identify printed or written characters on scanned documents (in addition to electronic documents which are addressed similarly. However, the available computer packages do not perform optimally to recognize burned-in character words in video or picture frames. The character burn-in in video or picture frames is characterized by an arbitrary font with a dynamic blend of edges into the picture. This is in contrast to typical black type print on a white background providing a high contrast. The character edge anti-aliasing (to reduce jaggedness) and blending changes dynamically with the neighboring characters in the word. Additionally, if the characters are burned in directly on top of picture, the picture background will have a very strong influence on the character definition. Further, the character burn-ins are subject to even more edge distortion and frame-to-frame differences with any one or more of the following operations on the video or picture: dynamic zoom, in and out, frame rate conversion, and compression, especially at a lower bitrate. Thus, a specialized OCR that can overcome all the above challenges is desirable.

In an exemplary implementation, an effective OCR functions as a classifier trained to recognize fonts and burn-ins in video picture frames under many video conditions. The classifier may be trained using a wide dataset of labeled character images. The character images consist of samples of characters manually identified from dailies or commercial video with burn-ins, synthetic data of varying fonts and font sizes rendered to video labeled with the known input, or a combination of sampled fonts and synthetic fonts. Classes of datasets may consist of upper-case and lower-case letters, numbers, symbols, and special characters such as underscore, semicolon, period, forward slash, and backward slash that may appear in timecodes and filenames.

In order to minimize the manual process of identifying sampled fonts from actual dailies, a synthetic dataset may be created. Then, a classifier is trained on the synthetic dataset and used to classify the dailies samples. The results may be checked manually, corrected, and added to the dataset. The classifier is retrained on the combined dataset. This process may be used to grow the dataset by repeating it to include new fonts, or to refine the dataset, when a sample is misclassified.

One exemplary classifier appropriate for classifying the character images is the k-Nearest Neighbor (kNN) classifier, a supervised machine learning algorithm. The kNN classifier searches for the closest match of an unlabeled sample image within the dataset's feature space. In order to provide consistency in the results, each font image provided to the classifier is resized to 40×40 pixels with 8 bits of intensity value (grayscale). Each feature vector is therefore an array of 1600 values, ranging from 0 to 255. For a given unlabeled sample feature, the kNN algorithm finds k number of closest matches to the sample and labels the sample with the class label with the most votes out of k. A value of k=5 has been found to provide appropriate results for classification.

The OCR process 500 of FIG. 5 is designed to prioritize and target specific frames in order of interest and avoid the need process every frame in the clip. The priority is set to examine the boundary frames for each shot previously identified and then expand the order of interest to a few arbitrary frames within the shot, based on pre-computed time coded frame distances from the time codes of the frames at the boundaries. Additionally, only the top 7-20% of the chosen frames are scanned in this process.

In a first step of the OCR process 500, the red/green/blue (RGB) color information in the identified burned-in frame is converted to a hue/saturation/value representation as indicated in step 502. Then the hue and saturation channels are discarded and the value (relative darkness or lightness of the color) is retained for further processing applications as indicated in step 504. The white balance of the value channel is then adjusted if the maximum magnitude of the value is less than 128 (V<128) in order to equalize the difference between black and white and increase sharpness and contrast for character identification as indicated in step 506. Additional contrast adjustment may be appropriate for dark fade frames. The vertical middle of the frame may then be masked to leave only horizontal bands of 7-20% each of the vertical dimension of the frames as indicated in step 508. These bands are where the burn-in characters are most likely located.

Next, the goal is to determine distinct bounding boxes for whole "words" or text entities based on the expected intent of information. The information includes timecode, camera roll names, file name, scene and take, etc. Area where "words" are likely found may be determined using a combination of one or more of the following morphological operations on the top and bottom horizontal bands as indicated in step 510.

For example, a Gaussian smoothing operator (e.g. 5×5), i.e., a 2-D convolution operator, may be used to "blur" images and remove detail and noise. This is similar to a mean filter, but it uses a different kernel that represents the shape of a Gaussian ('bell-shaped') hump. In addition, or as an alternative, morphological erosion and dilation may be used to remove noise and detail. Erosion is helpful in removing edge effects and noise in the image. Dilation may then be used to "fatten" the characters such that adjacent characters are closer, even to the point of touching, as closeness between characters will indicate potential word elements. It may be desirable to use an ellipse kernel for the erosion algorithm. Histogram equalization may be performed between erosion and dilation in order to further increase contrast between characters and background. Another method that may be used to increase contrast is binary thresholding, which allocates a pixel to be black or white if the pixel brightness value is less than a selected threshold value, e.g., 170, and allocates to white if the pixel brightness value is greater than the threshold value.

Once the contrast between the characters and the background has been increased, the bands may be subjected to pyramid downsampling by a factor of 2× as indicated in step 512. This may further help identify connected characters indicating "words" by moving characters closer together. Next, contours of the "words," which are likely to be the burn-in information, may be detected to identify locations of connected characters within the bands, for example, by using the cv.boundingRect or cv.minAreaRect algorithms from OpenCV (Open Source Computer Vision Library, https://opencv.org/), as indicated in step 514. Each contour represents a bounding box of a distinct text region in each of the frames of a particular shot.

The bounding box information is then used to identify text regions in the original raw source frames that likely contain the burn-in information. The text regions are then segmented to isolate individual characters distinctly as indicated in step 516. For example, a threshold algorithm (e.g., cv::inRange (OpenCV, https://opencv.org/)) may be used to separate text pixels from background pixels. It may be assumed that the text pixels are brighter (have a higher code value) than the background pixels. The thresholding operation sets the background pixels to zero if those pixels are less than the threshold value, while leaving the other pixels unmodified. In one implementation, the threshold value may be set at the $80^{th}$ percentile of the text region. Using a hard-coded value (e.g., 127 middle gray, where 255 is white) for the threshold value would fail to separate text from background if the background pixels happen to be brighter than the threshold value (e.g., text on cloud background). Therefore, an adaptive solution of using the some percentage of the code values within the text region bounding box as the threshold value may be used.

Contours within each text region are then located to identify individual characters. The same contour finding method described above (without pyramid downsampling) may be performed within the word areas identified in step 516, but on the value image rendered in step 504 rather than the downsampled and blurred image version used to find the text words. The connected components will be recognized in this contour-finding pass as pixels of the same character as opposed to connected characters of a word. Simple heuristics may then be used to join the contours vertically. For example, in one exemplary implementation bounding boxes of the contours may be checked to determine whether they overlap vertically. If there is a vertical overlap, the bounding boxes are merged into one bounding box to indicate a single character (e.g., a colon ":" or the lowercase letter "i"). The text regions are thereby sliced vertically per character at each contour location such that each character is in a separate bounding box. For example, an image in a text region containing "VT512" becomes five separate image regions representing 'V', 'T', '5', '1', and '2'. The character images are crops from the Value channel of a given video frame converted to HSV color space. This discards color information, as it is assumed that text burn-ins are white text on a black or dark background. As noted above, a colon ":" in a timecode would be detected as two individual, vertically-aligned contours which are merged and considered as a single character.

The next step is to resize each character image to 40 pixels wide by 40 pixels high as indicated in step 518. Depending on the font size that was used to render the burn-ins, the resize operation may reduce or enlarge the character image from its original size. The aspect ratio of the character image may also change, e.g., a tall and skinny 'T' may become a square. Resizing each character image to a common size enables the comparison of image features between a sample character image and a dataset of labeled character images. The value of 40 pixels squared (i.e., 1600 pixels) balances the requirement of maintaining enough image detail to distinguish between characters, as well as reducing the memory storage of a dataset consisting of thousands of character images. Appropriate values for given situations may be chosen empirically.

The segmented characters may then be recognized with the Knn classifier (k=5) previously trained as indicated in step 520. As noted above, the kNN classifier searches for the closest match of each segmented character image within the dataset. For a given unlabeled sample feature, the kNN algorithm finds k number of closest matches to the sample and labels the sample with the class label with the most votes out of k. As the values are determined, a metadata file of frame information may be constructed in for each shot as indicated in step 522.

Note that there is no advantage of using a dictionary-based, word prediction approach typical of OCR software for the purpose of OCR of burn-ins. For example, in the case of a timecode, recognizing an eleven-character word with three colons does not provide enough information to predict "05:15:13:23". This reason, combined with the simplicity of classification by character instead of by word, suggests the approach of segmenting and treating each character independently.

The extracted metadata may be organized into categories based on corresponding burn-in locations in the image frame. For example, a single frame can have the following burn-ins at the specified locations:

Top Left=01:01:10:13 (source time code)
Top Center=Scene 4 Take 2 (scene & take)
Top Right=A001 (Camera Roll Name)
Bottom Left=01:01:10:12 (audio time code)
Bottom Right=A001C00121513.MXF (file name with extension)

In the above example, the OCR extracted metadata may be automatically categorized into Top Left, Top right, Top Center, Bottom Left, and Bottom Right. Additionally, these categories may be further grouped based on time code type and string type. The categories and groupings may be packaged and presented to the user with options to select between the different strings or different timecode if necessary.

Figure 6:
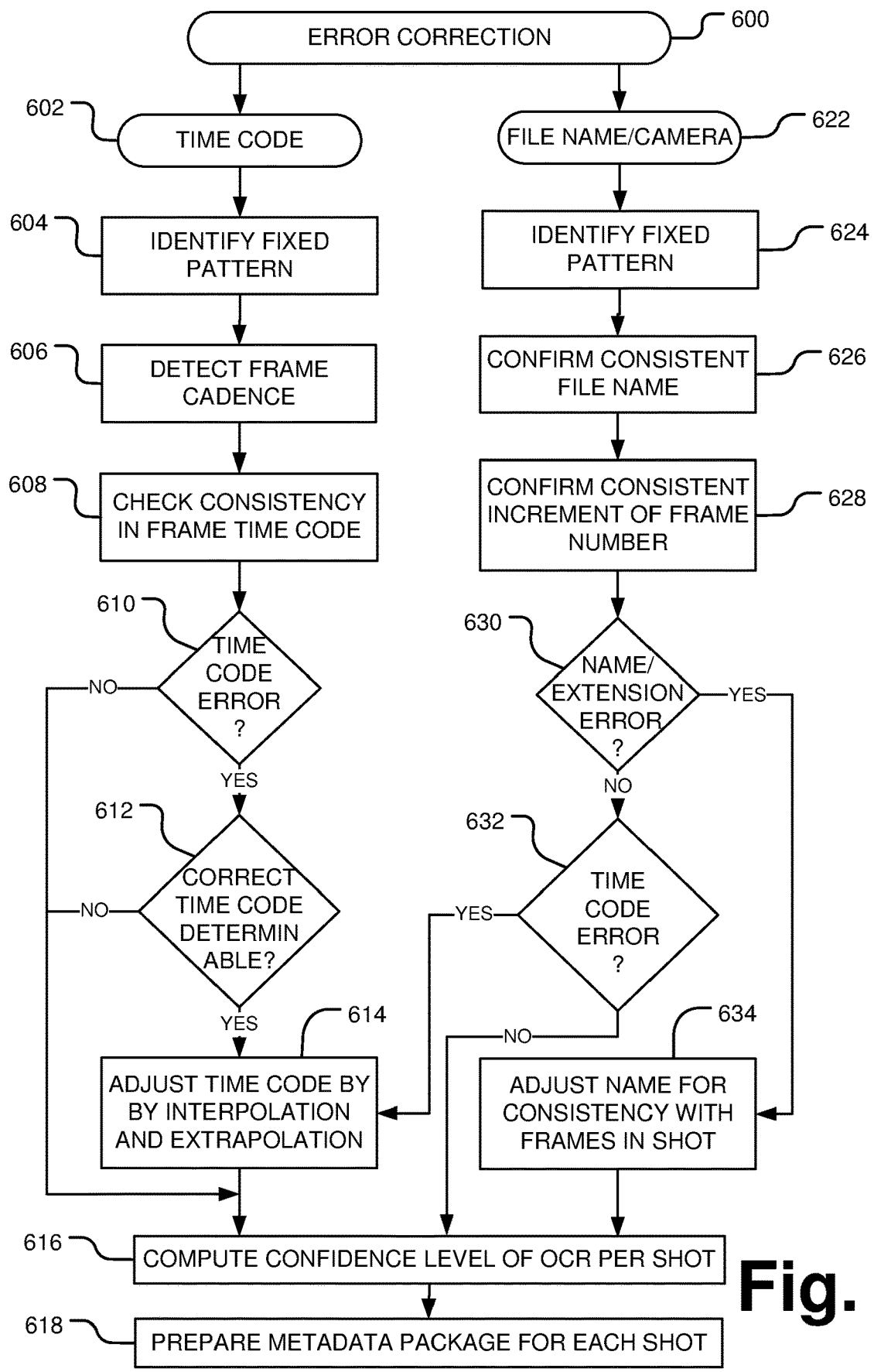
FIG. 6 is a flow diagram of an error correction process to increase accuracy in the frame data perceived from the burn-ins.

The identified metadata from the OCR process 500 is further refined and error corrected by evaluating the corresponding metadata extracted from neighboring frames and from arbitrary frames at pre-computed timecode offset from the shot boundaries as shown in the error correction process 600 of FIG. 6. Two kinds of error correction may be used.

A first method relates to correction of burn-in timecodes based upon frame rate corrections as indicated in step 602. Depending on the frame rate of the shot, the timecode of the shot increments at a fixed rate. Based on this assumption, the timecode can be easily extrapolated in either direction of the seed OCR frame to determine the fixed pattern of the frame rate as indicated in step 604. Metadata extracted from arbitrary frames can therefore be crosschecked against the extrapolated or interpolated timecode. In addition, an alternate cadence may have been established by the editing process and cadence should be checked as indicated in step 606. For example if the frames are presented in slow motion, there may be three frames of identical timecode before changing to three more identical frames of the same timecode. Alternatively, the edit may skip frames and thus the cadence would consider the number of frames skipped between adjacent frames based upon timecode.

If there is an error as considered in decision step 610, by cross-checking the timecode against half a dozen frames in either direction of the seed frame, errors in OCR based extracted metadata can be identified. If errors are identified but cannot be rectified due to inadequate information, additional neighboring frames may be evaluated with OCR as indicated in step 612. If there is enough information based upon frame interpolation to determine the correct timecode, the error may be corrected as indicated in step 614. This process continues until all errors are fixed or all options are exhausted.

Alternatively, a parallel process for error correction of burned in camera roll names or filenames is indicated at step 622. The fixed pattern or specific format of text representation of the camera roll information and filename are determined as indicated in step 624. For example, although a camera roll name is simply alphanumeric, it is usually a combination of a character or characters followed by numbers and sometime followed by a second set of a character and numbers, for example, A001 or A001C001. Separately, the filename may have two manifestations as follows. First, an alphanumeric string followed by a period ".", and static three-character extension, for example, A001C001EG0241.MXF. Second, an alphanumeric string followed by a period ".", an incrementing frame number, and a static three-character extension, for example, A001C001MA01.013511.ari.

Based on these formats, the extension of the file name is checked in each frame and error corrected if necessary. Both the extension and the alphanumeric camera roll string, before the period "." must be static and consistent throughout the shot as indicated in step 626. Further, the incrementing frame number, if available, will increment at a fixed cadence and can be used to verify the timecode as well as the frame rate of the shot as indicated in step 628. If an error is detected as contemplated in decision step 630, the file name and extension may be adjusted for consistency with other frames in the shot as indicated in step 634. Alternatively, if a timecode error is determined as indicated in decision step 632, the timecode may be adjusted by interpolation and extrapolation as in step 614.

Next, a confidence level is computed for each OCR evaluation per shot as indicated in step 616. The confidence level is labeled per type or field of metadata extracted. The confidence level is either promoted or demoted depending on the further evaluation of the metadata in the error correction phase. If the error correction phase identifies an error without correction, the OCR established confidence level is demoted. However, if the error correction phase results in a correction of the metadata, the confidence level will be promoted to a higher level. Every shot is afforded a percentage level as an overall shot confidence. Additionally, every extracted metadata receives individual confidence levels. For example, the source timecode could have a 100% confidence, but the camera roll name could only have a 50% confidence. Eventually, when this information is presented to the user through a user interface in the conform process, it expedites the user validation process by allowing the user to concentrate their attention for validation only in areas where it is necessary.

The error corrected and verified metadata from OCR may be categorized and packaged into a data bundle that is transmitted to the conform system as indicated in step 618. The application unpacks the data bundle and presents it to the user along with the video stream of the original clip with burned in metadata. The user can then focus on the validating the metadata of shots with lower confidence level and visually validate or rectify the metadata (if necessary) by checking it against burn-ins in the frame of the video stream.

In any embodiment or component of the system described herein, the offline video conformance system 700 includes one or more processors 702 and a system memory 706 connected by a system bus 704 that also operatively couples various system components. There may be one or more processors 702, e.g., a d central processing unit (CPU), or a plurality of processing units, commonly referred to as a parallel processing environment (for example, a dual-core, quad-core, or other multi-core processing device). In addition to the CPU, the offline video conformance system 700 may also include one or more graphics processing units (GPU) 740. A GPU 740 is specifically designed for rendering video and graphics for output on a monitor. A GPU 740 may also be helpful for handling video processing functions even without outputting an image to a monitor. By using separate processors for system and graphics processing, computers are able to handle video and graphic-intensive applications more efficiently. As noted, the system may link a number of processors together from different machines in a distributed fashion in order to provide the necessary processing power or data storage capacity and access.

The system bus 704 may be any of several types of bus structures including a memory bus or memory controller, a peripheral bus, a switched-fabric, point-to-point connection, and a local bus using any of a variety of bus architectures. The system memory 706 includes read only memory (ROM) 708 and random access memory (RAM) 710. A basic input/output system (BIOS) 712, containing the basic routines that help to transfer information between elements within the offline video conformance system 700, such as during start-up, is stored in ROM 708. A cache 714 may be set aside in RAM 710 to provide a high speed memory store for frequently accessed data.

A data storage device 718 for nonvolatile storage of applications, files, and data may be connected with the system bus 704 via a device attachment interface 716, e.g., a Small Computer System Interface (SCSI), a Serial Attached SCSI (SAS) interface, or a Serial AT Attachment (SATA) interface, to provide read and write access to the data storage device 718 initiated by other components or applications within the image classifying system 700. The data storage device 718 may be in the form of a hard disk drive or a solid state memory drive or any other memory system. A number of program modules and other data may be stored on the data storage device 718, including an operating system 720, one or more application programs, and data files. In an exemplary implementation, the data storage device 718 may store various video processing filters 722, a conform platform 724, a shot boundary detection module 726, an OCR module 728 including a classifier, and an error correction module 730, as well as the film and video clips being processed and any other programs, functions, filters, and algorithms necessary to implement the image classifying procedures described herein. Alternatively, the raw film and low-res offline video may be stored in one or more separate video servers linked to the offline video conformance system 700 over a local area network 754 or wide area network 760 as described herein. The data storage device 718 may also host a database 732 (e.g., a NoSQL database) for storage of metadata including timecodes and other frame identification information perceived from the burn-in frames and other relational data necessary to perform the image processing and perception procedures described herein. Note that the data storage device 718 may be either an internal component or an external component of the computer system 700 as indicated by the hard disk drive 718 straddling the dashed line in FIG. 7.

In some configurations, the offline video conformance system 700 may include both an internal data storage device 718 and one or more external data storage devices 736, for example, a CD-ROM/DVD drive, a hard disk drive, a solid state memory drive, a magnetic disk drive, a tape storage system, and/or other storage system or devices. The external storage devices 736 may be connected with the system bus 704 via a serial device interface 734, for example, a universal serial bus (USB) interface, a SCSI interface, a SAS interface, a SATA interface, or other wired or wireless connection (e.g., Ethernet, Bluetooth, 802.11, etc.) to provide read and write access to the external storage devices 736 initiated by other components or applications within the offline video conformance system 700. The external storage device 736 may accept associated computer-readable media to provide input, output, and nonvolatile storage of computer-readable instructions, data structures, program modules, and other data for the offline video conformance system 700.

A display device 742, e.g., a monitor, a television, or a projector, or other type of presentation device may also be connected to the system bus 704 via an interface, such as a video adapter 744 or video card. Similarly, audio devices 737, for example, external speakers, headphones, or a microphone (not shown), may be connected to the system bus 704 through an audio card or other audio interface 738 for presenting audio associated with the film clips during review.

In addition to the display device 742 and audio device 737, the offline video conformance system 700 may include other peripheral input and output devices, which are often connected to the processor 702 and memory 706 through the serial device interface 734 that is coupled to the system bus 704. Input and output devices may also or alternately be connected with the system bus 704 by other interfaces, for example, universal serial bus (USB), an IEEE 794 interface ("Firewire"), a parallel port, or a game port. A user may enter commands and information into the offline video conformance system 700 through various input devices including, for example, a keyboard 746 and pointing device 748, for example, a computer mouse. Other input devices (not shown) may include, for example, a joystick, a game pad, a tablet, a touch screen device, a scanner, a facsimile machine, a microphone, a digital camera, and a digital video camera.

Output devices may include a printer 750. Other output devices (not shown) may include, for example, a plotter, a photocopier, a photo printer, a facsimile machine, and a printing press. In some implementations, several of these input and output devices may be combined into single devices, for example, a printer/scanner/fax/photocopier. In some implementations, an audio device such as a loudspeaker may be connected via the serial device interface 734 rather than through a separate audio interface.

Figure 7:
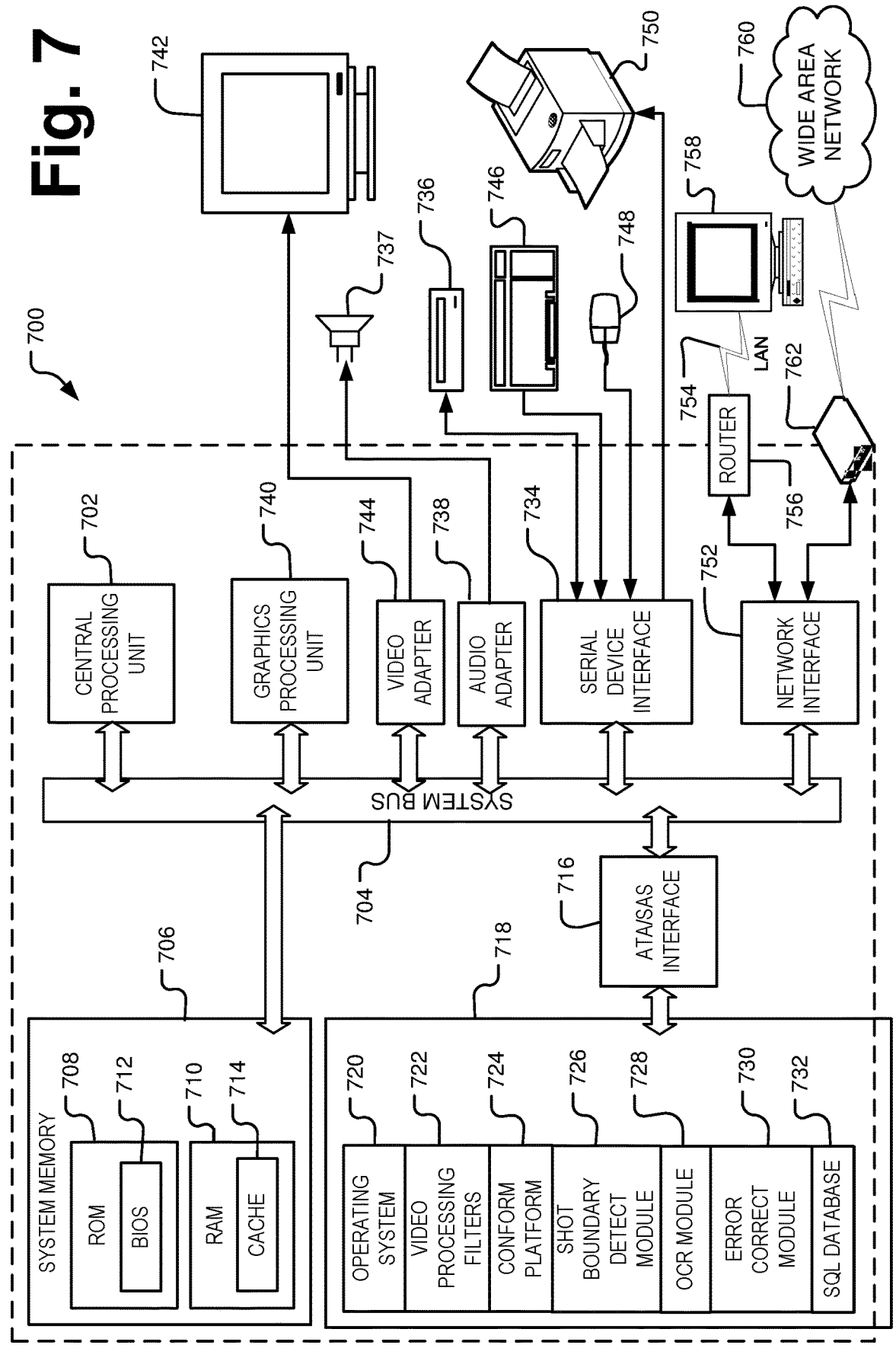
FIG. 7 is a schematic diagram of an exemplary computer system configured for identifying frame burn-ins and conforming content to original camera source frames as described herein.

The offline video conformance system 700 may operate in a networked environment using logical connections through a network interface 752 coupled with the system bus 704 to communicate with one or more remote devices. The logical connections depicted in FIG. 7 include a local-area network (LAN) 754 and a wide-area network (WAN) 760. Such networking environments are commonplace in office networks, home networks, enterprise-wide computer networks, and intranets. These logical connections may be achieved by a communication device coupled to or integral with the offline video conformance system 700. As depicted in FIG. 7, the LAN 754 may use a router 756 or hub, either wired or wireless, internal or external, to connect with remote devices, e.g., a remote computer 758, similarly connected on the LAN 754. The remote computer 758 may be a personal computer, a server, a client, a peer device, or other common network node, and typically includes many or all of the elements described above relative to the offline video conformance system 700.

To connect with a WAN 760, the offline video conformance system 700 typically includes a modem 762 for establishing communications over the WAN 760. Typically the WAN 770 may be the Internet. However, in some instances the WAN 760 may be a large private network spread among multiple locations, or a virtual private network (VPN). The modem 762 may be a telephone modem, a high speed modem (e.g., a digital subscriber line (DSL) modem), a cable modem, or similar type of communications device. The modem 762, which may be internal or external, is connected to the system bus 718 via the network interface 752. In alternate embodiments the modem 762 may be connected via the serial port interface 744. It should be appreciated that the network connections shown are exemplary and other means of and communications devices for establishing a network communications link between the computer system and other devices or networks may be used.

The technology described herein may be implemented as logical operations and/or modules in one or more computer systems configured for special purpose processing of image frames and pictures to create labeled and searchable classes of image elements during film and television production. The logical operations may be implemented as a sequence of processor-implemented steps directed by software programs executing in one or more computer systems or as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the invention. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for conforming offline video content to original source frames performed in a computer system having a processor and a memory, the method comprising
    ingesting a video clip within the memory of the computer system, the video clip comprising a series of frames and having a plurality of shots and shot boundaries therein and further including frame identification information burned into a perimeter of a plurality of the series of frames;
    identifying via operations within the processor the shot boundaries between adjacent frames within the video clip;
    locating via operations within the processor burn-in areas in the frames adjacent to the shot boundaries that contain burn-in information;
    perceiving via operations within the processor character strings within the burn-in areas in the frames adjacent to the shot boundaries;
    recognizing via operations within the processor visually perceptible characters within the character strings;
    separating via operations within the processor the visually perceptible characters;
    performing via operations within the processor an optical character recognition using a trained classifier on the separated visually perceptible characters to identify the frame identification information represented by the characters;
    correcting errors in the identified frame identification information via operations within the processor by
        determining cadence, consistency, or both, between timecodes in the frame identification information in adjacent frames; and
        adjusting timecodes of inconsistent frames or out of cadence frames to conform with the consistency or cadence of other frames within a particular shot in the video clip; and
    storing the frame identification information as a metadata file in a relational database within the memory for use with an edit decision list application to identify source image frames corresponding to the frame identification information to create a high resolution instantiation of the video clip.

2. The method of claim 1 further comprising
correcting errors in the identified frame identification information via operations within the processor by
determining consistency of a file name in the frame identification information in adjacent frames; and
adjusting the file names of inconsistent frames to conform with consistency of other file names of other frames within a particular shot in the video clip.

3. The method of claim 1, wherein the step of identifying the shot boundaries further comprises
masking an area of the frames of the video clip without covering bands along a top edge and a bottom edge of each of the frames;
computing a perceptual fingerprint of each frame outside of the area covered by the mask; and
comparing the perceptual fingerprint values between frames to determine difference values between frames, wherein
if the difference value between frames is below a threshold value, categorizing the compared frames as being within a same shot; and
if the difference value between frames is above the threshold value, categorizing the compared frames as being within different shots.

4. The method of claim 3, wherein the step of identifying the shot boundaries further comprises
locating a darkest frame in the video clip; and
identifying a presence or absence of a watermark in the darkest frame; wherein
if a watermark is identified,
defining a boundary area of the watermark; and
fitting the masked area to the boundary area of the watermark.

5. The method of claim 3, wherein
the computation of the perceptual hash is based upon color values of pixels in the frames; and
the step of identifying the shot boundaries further comprises identifying whether the shot boundary is a cut or dissolve based upon the perceptual hash of the color values.

6. The method of claim 3, wherein
the computation of the perceptual hash is based upon luminance values of pixels in the frames; and
the step of identifying the shot boundaries further comprises identifying whether the shot boundary is a fade based upon the perceptual hash of the luminance values.

7. The method of claim 1, wherein the step of locating burn-in areas further comprises masking an area of each frame without covering bands along a top edge and a bottom edge of each frame.

8. The method of claim 7, wherein the step of perceiving character strings further comprises
converting color information in each frame to hue/saturation/value information;
discarding the hue and saturation information;
performing morphological operations on the bands to increase a contrast between characters in the bands and a background of the bands.

9. The method of claim 8, wherein the step of recognizing visually perceptible characters further comprises
pyramid downsampling the bands to identify connected characters; and
identifying contours of connected characters.

10. The method of claim 9, wherein the step of separating visually perceptible characters further comprises
segmenting connected characters;
identifying contours of individual characters previously segmented; and
resizing the segmented characters into a uniform character image size.

11. The method of claim 1, wherein the step of performing optical character recognition includes using a trained nearest neighbor classifier.

12. A non-transitory computer readable medium containing instructions for instantiating a computer system having a processor and a memory to conform offline video content to original source frames, wherein the instructions configure the processor to implement a computer process comprising the steps of
ingesting a video clip within the memory of the computer system, the video clip comprising a series of frames and having a plurality of shots and shot boundaries therein and further including frame identification information burned into a perimeter of a plurality of the series of frames;
identifying via operations within the processor the shot boundaries between adjacent frames within the video clip;
locating via operations within the processor burn-in areas in the frames adjacent to the shot boundaries that contain burn-in information;
perceiving via operations within the processor character strings within the burn-in areas in the frames adjacent to the shot boundaries;
recognizing via operations within the processor visually perceptible characters within the character strings;
separating via operations within the processor the visually perceptible characters;
performing via operations within the processor an optical character recognition using a trained classifier on the separated visually perceptible characters to identify the frame identification information represented by the characters;
correcting errors in the identified frame identification information by
determining cadence, consistency, or both, between timecodes in the frame identification information in adjacent frames; and
adjusting timecodes of inconsistent frames or out of cadence frames to conform with the consistency or cadence of other frames within a particular shot in the video clip; and
storing the frame identification information as a metadata file in a relational database within the memory for use with an edit decision list application to identify source image frames corresponding to the frame identification information to create a high resolution instantiation of the video clip.

13. The non-transitory computer readable storage medium of claim 12, wherein the instructions configure the processor to implement a further processing step comprising
correcting errors in the identified frame identification information by
determining consistency of a file name in the frame identification information in adjacent frames; and
adjusting the file names of inconsistent frames to conform with consistency of other file names of other frames within a particular shot in the video clip.

14. The non-transitory computer readable storage medium of claim 12, wherein the instructions further implement the step of identifying the shot boundaries by configuring the processor to
- mask an area of the frames of the video clip without covering bands along a top edge and a bottom edge of each of the frames;
- compute a perceptual fingerprint of each frame outside of the area covered by the mask; and
- compare the perceptual fingerprint values between frames to determine difference values between frames, wherein
- if the difference value between frames is below a threshold value, categorize the compared frames as being within a same shot; and
- if the difference value between frames is above the threshold value, categorize the compared frames as being within different shots.

15. The non-transitory computer readable storage medium of claim 14, wherein the instructions further implement the step of identifying the shot boundaries by configuring the processor to
- locate a darkest frame in the video clip; and
- identify a presence or absence of a watermark in the darkest frame; wherein
- if a watermark is identified,
  - define a boundary area of the watermark; and
  - fit the masked area to the boundary area of the watermark.

16. The non-transitory computer readable storage medium of claim 14, wherein
- the computation of the perceptual hash is based upon color values of pixels in the frames; and
- the instructions further implement the step of identifying the shot boundaries by configuring the processor to identify whether the shot boundary is a cut or dissolve based upon the perceptual hash of the color values.

17. The non-transitory computer readable storage medium of claim 14, wherein
- the computation of the perceptual hash is based upon luminance values of pixels in the frames; and
- the instructions further implement the step of identifying the shot boundaries by configuring the processor to identify whether the shot boundary is a fade based upon the perceptual hash of the luminance values.

18. The non-transitory computer readable storage medium of claim 12, wherein the step of locating burn-in areas further comprises masking an area of each frame without covering bands along a top edge and a bottom edge of each frame.

19. The non-transitory computer readable storage medium of claim 18, wherein the instructions further implement the step of perceiving character strings by configuring the processor to
- convert color information in each frame to hue/saturation/value information;
- discard the hue and saturation information;
- perform morphological operations on the bands to increase a contrast between characters in the bands and a background of the bands.

20. The non-transitory computer readable storage medium of claim 19, wherein the instructions further implement the step of recognizing visually perceptible characters by configuring the processor to
- pyramid downsample the bands to identify connected characters; and
- identify contours of connected characters.

21. The non-transitory computer readable storage medium of claim 20, wherein the instructions further implement the step of separating visually perceptible characters by configuring the processor to
- segment connected characters;
- identify contours of individual characters previously segmented; and
- resize the segmented characters into a uniform character image size.

22. The non-transitory computer readable storage medium of claim 12, wherein the step of performing optical character recognition includes using a trained nearest neighbor classifier.

* * * * *